United States Patent
Ouyang (10) Patent No.: US 9,496,792 B2
(45) Date of Patent: Nov. 15, 2016

(54) CONTROLLER WITH THERMAL BALANCE AND CONTROL METHOD THEREOF FOR MULTI-PHASE SWITCHING CONVERTERS

(71) Applicant: Chengdu Monolithic Power Systems Co., Ltd., Chengdu (CN)

(72) Inventor: Qian Ouyang, Hangzhou (CN)

(73) Assignee: CHENGDU MONOLITHIC POWER SYSTEMS CO., LTD., Chengdu (CN)

( * ) Notice: Subject to any disclaimer, the term of this patent is extended or adjusted under 35 U.S.C. 154(b) by 287 days.

(21) Appl. No.: 14/318,628

(22) Filed: Jun. 28, 2014

(65) Prior Publication Data
US 2015/0002126 A1    Jan. 1, 2015

(30) Foreign Application Priority Data
Jun. 28, 2013    (CN) .......................... 2013 1 0268361

(51) Int. Cl.
*H02M 1/32*    (2007.01)
*H02M 3/158*    (2006.01)

(52) U.S. Cl.
CPC ..... *H02M 3/1584* (2013.01); *H02M 2001/327* (2013.01)

(58) Field of Classification Search
CPC .............. H02M 1/32; H02M 2001/327; H02M 3/155; H02M 3/156; H02M 3/158; H02M 3/1582; H02M 3/1584
USPC ....................................................... 323/304
See application file for complete search history.

(56) References Cited

U.S. PATENT DOCUMENTS

| | | | |
|---|---|---|---|
| 2003/0111984 A1* | 6/2003 | Isham | G01R 31/40 323/271 |
| 2004/0150928 A1* | 8/2004 | Goodfellow | H02M 3/1584 361/90 |
| 2005/0046370 A1* | 3/2005 | Gallegos-Lopez | H02P 21/06 318/434 |
| 2011/0025284 A1 | 2/2011 | Xu et al. | |
| 2011/0115447 A1* | 5/2011 | Lin | H02M 3/1584 323/234 |
| 2011/0188218 A1 | 8/2011 | Hsing et al. | |
| 2012/0161741 A1* | 6/2012 | Zambetti | G05F 3/262 323/294 |
| 2012/0274293 A1 | 11/2012 | Ren et al. | |
| 2012/0299560 A1* | 11/2012 | Gu | H02M 3/1584 323/212 |
| 2013/0020971 A1* | 1/2013 | Gallegos-Lopez | H02P 21/0089 318/400.02 |
| 2014/0035654 A1 | 7/2013 | Jiang et al. | |
| 2013/0307498 A1 | 11/2013 | Jiang et al. | |
| 2013/0307503 A1 | 11/2013 | Ouyang et al. | |
| 2013/0342176 A1 | 12/2013 | Yang et al. | |
| 2014/0167833 A1 | 6/2014 | Jiang et al. | |

\* cited by examiner

*Primary Examiner* — Jessica Han
*Assistant Examiner* — David A. Singh (57) ABSTRACT

A controller used in a multi-phase switching converter, including: a bias current generator that generates a plurality of bias current signals; a temperature balance modulating circuit that generates a plurality of on time signals based on the plurality of the bias current signals; and a logic circuit that generates a plurality of control signals based on the plurality of on time signals. The plurality of the control signals is used to control a plurality of switching circuits of the multi-phase switching converter.

12 Claims, 6 Drawing Sheets

CONTROLLER WITH THERMAL BALANCE AND CONTROL METHOD THEREOF FOR MULTI-PHASE SWITCHING CONVERTERS

CROSS-REFERENCE TO RELATED APPLICATION(S)

This application claims the benefit of CN application 201310268361.X, filed on Jun. 28, 2013, and incorporated herein by reference.

TECHNICAL FIELD

The present invention generally relates to electronic circuits, and more particularly but not exclusively to controllers and control methods of multi-phase switching converters with thermal balance.

BACKGROUND

Multi-phase switching converters are widely used in power solutions of CPU because of its good performance. For multi-phase switching converters, thermal balance is needed to make sure none of the phases is running too hot.

Figure 1:
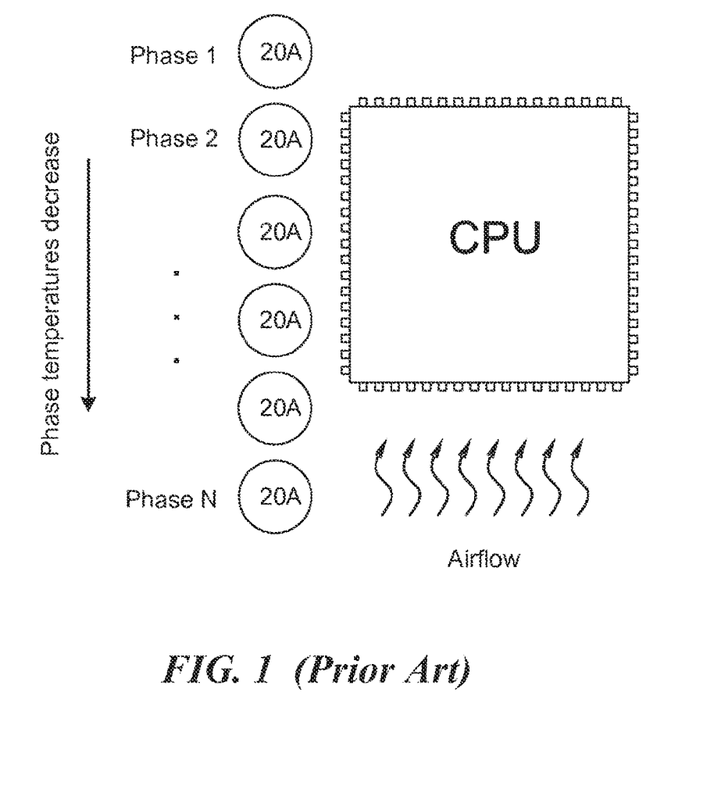
FIG. 1 illustrates the thermal condition of a prior multi-phase switching converter used in a CPU system.

Usually, thermal balance is achieved by balancing the output current of each phase. Ideally, the power loss and temperature rise should be same if the phase current is the same as each other. However, considering the cooling airflow in the real system, it's very likely that the temperature is not balanced even each phase takes the same current. FIG. 1 illustrates the thermal condition of a prior multi-phase switching converter used in a CPU system. As shown in FIG. 1, the phase current is the same as each other, but there is a progressive temperature decrease because of the cooling airflow.

SUMMARY

Embodiments of the present invention are directed to a controller used in a multi-phase switching converter, wherein the multi-phase switching converter comprises a plurality of switching circuits. The controller comprises a bias current generator, a plurality of add-subtraction arithmetic units, a plurality of proportional integrators and a control circuit. The bias current generator is configured to receive the plurality of phase temperature signals representative of the temperature of the plurality of switching circuits, and to generate a plurality of bias current signals based on the plurality of phase temperature signals and a temperature reference signal. Each of the add-subtraction arithmetic units has a first input terminal, a second input terminal, a third input terminal and an output terminal, wherein the first input terminal is configured to receive the current reference signal, the second input terminal is coupled to the corresponding output terminal of the bias current generator to receive the corresponding bias current signal, the third input terminal is coupled to the corresponding switching circuit to receive the corresponding phase current signal representative of an output current, and wherein each of the add-subtraction arithmetic unit subtracts the phase current signal from the sum of the bias current signal and the current reference signal, and generates a current error signal at the output terminal. Each of the proportional integrators has an input terminal and an output terminal, wherein the input terminal is coupled to the output terminal of the corresponding add-subtraction arithmetic unit to receive the current error signal, and wherein the proportional integrator proportionally integrates the current error signal, and generates the bias signal at the output terminal. The control circuit is coupled to the plurality of proportional integrators to receive the plurality of bias signals, wherein based on the plurality of bias signals, the control circuit generates a plurality of control signals to control the plurality of switching circuits.

Embodiments of the present invention are also directed to a control method of a multi-phase switching converter, wherein the multi-phase switching converter comprises a plurality of switching circuits. The control method comprises: subtracting a phase temperature signal representative of the temperature of the corresponding switching circuit from a temperature reference signal and generating a temperature error signal; proportionally integrating the temperature error signal and generating a bias current signal; subtracting a phase current signal representative of an output current of the corresponding switching circuit from the sum of the bias current signal and a current reference signal, and generating a current error signal; proportionally integrating the current error signal and generating a bias signal; and adjusting a control signal controlling the switching circuit based on the bias signal.

BRIEF DESCRIPTION OF THE DRAWINGS

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended dams. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 2:
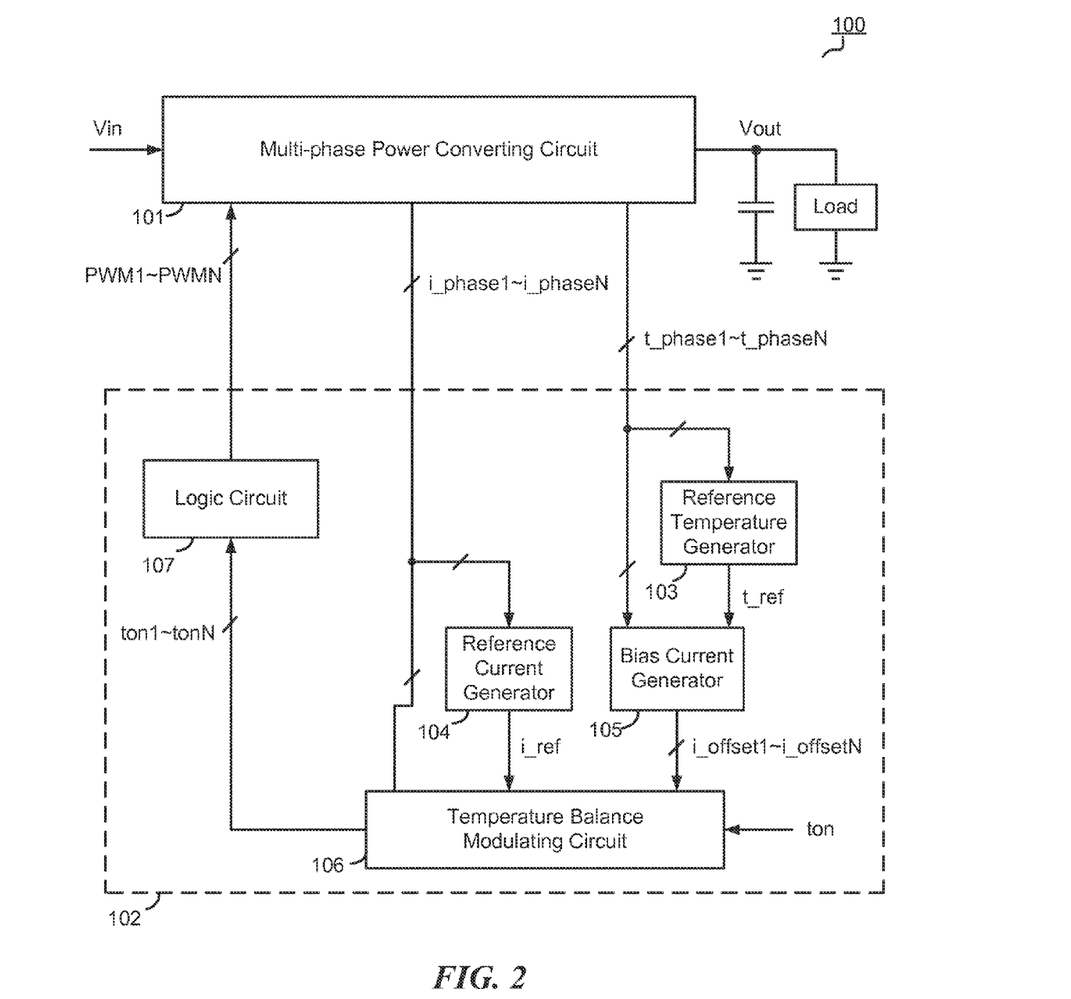
FIG. 2 illustrates a block diagram of a multi-phase switching converter 100 in accordance with an embodiment of the present invention.

FIG. 2 illustrates a block diagram of a multi-phase switching converter 100 in accordance with an embodiment of the present invention. The multi-phase switching converter 100 comprises a multi-phase power converting circuit 101 and a controller 102. The multi-phase power converting circuit 101 comprises N switching circuits, wherein N is an integer larger than 1. The input terminals of the switching circuits receive an input voltage Vin, and the output terminals are coupled together to provide an output voltage Vout to a load. The switching circuits in the multi-phase power converting circuit 101 may be configured in any known DC/DC or AC/DC topology, such as BUCK converter, BOOST converter, Forward converter, Flyback converter and so on. The controller 102 comprises a bias current generator 105, a temperature balance modulating circuit 106 and a logic circuit 107.

The bias current generator 105 is coupled to the switching circuits to receive the phase temperature signals t_phase1~t_phaseN representative of the temperature of the switching circuits. Based on the phase temperature signals t_phase1~t_phaseN and a temperature reference signal t_ref, the bias current generator 105 generates bias current signals i_offset1~i_offsetN.

The temperature balance modulating circuit 106 is coupled to the plurality of switching circuits to receive phase current signals i_phase1~i_phaseN representative of the output current of the switching circuits, and is coupled to the bias current generator 105 to receive the bias current signals i_offset1~i_offsetN. The temperature balance modulating circuit 106 is configured to generate on time signals ton1~tonN based on the phase current signals i_phase1~i_phaseN, the bias current signals i_offset1~i_offsetN, a current reference signal i_ref and a predetermined on time signal ton.

The logic circuit 107 is coupled to the temperature balance modulating circuit 106 to receive the on time signals ton1~tonN, wherein based on the on time signals ton1~tonN, the logic circuit 107 generates control signals PWM1~PWMN to control the switching circuits in the multi-phase power converting circuit 101. The on time signals ton1~tonN are used to control the on time of the switching circuits. The predetermined on time signal ton may be a constant value, or a variable value related to the input voltage Vin and/or the output voltage Vout. The multi-phase switching converter 100 may utilize a constant on-time (COT) control method. It may turn on the corresponding switching circuit when the output voltage Vout becomes smaller than a reference voltage, and turn off the corresponding switching circuit when the on time reaches a time threshold determined by the corresponding on time signal.

In the embodiment shown in FIG. 2, based on the temperature reference signal t_ref and phase temperature signals t_phase1~t_phaseN representative of the temperature of the switching circuits, the controller 102 generates the bias current signals i_offset1~i_offsetN. Then the bias current signals i_offset1~i_offsetN as well as the current reference signal i_ref are used to regulate the output current of the switching circuits by adjusting the control signals PWM1~PWMN, and thus the thermal balance of the switching circuits can be realized.

In an embodiment, the controller 102 further comprises a reference temperature generator 103. In one embodiment, the reference temperature generator 103 receives the phase temperature signals t_phase1~t_phaseN and selects one of them as the temperature reference signal t_ref provided to the bias current generator 105. The selected phase temperature signal may be predetermined, or determined by customers according to practical applications. The customer may write a register through a field bus to adjust the temperature reference signal t_ref. In another embodiment, the reference temperature generator 103 receives the phase temperature signals t_phase1~t_phaseN and takes the average of them as the temperature reference signal t_ref.

In an embodiment, the controller 102 further comprises a reference current generator 104. In one embodiment, the reference current generator 104 receives the phase current signals i_phase1~i_phaseN representative of the output current of the switching circuits and selects one of them as the current reference signal i_ref provided to the temperature balance modulating circuit 106. The selected phase current signal may be predetermined, or determined by customers according to practical applications. In another embodiment, the reference current generator 104 receives the phase current signals i_phase1~i_phaseN and takes the average of them as the current reference signal i_ref.

Figure 3:
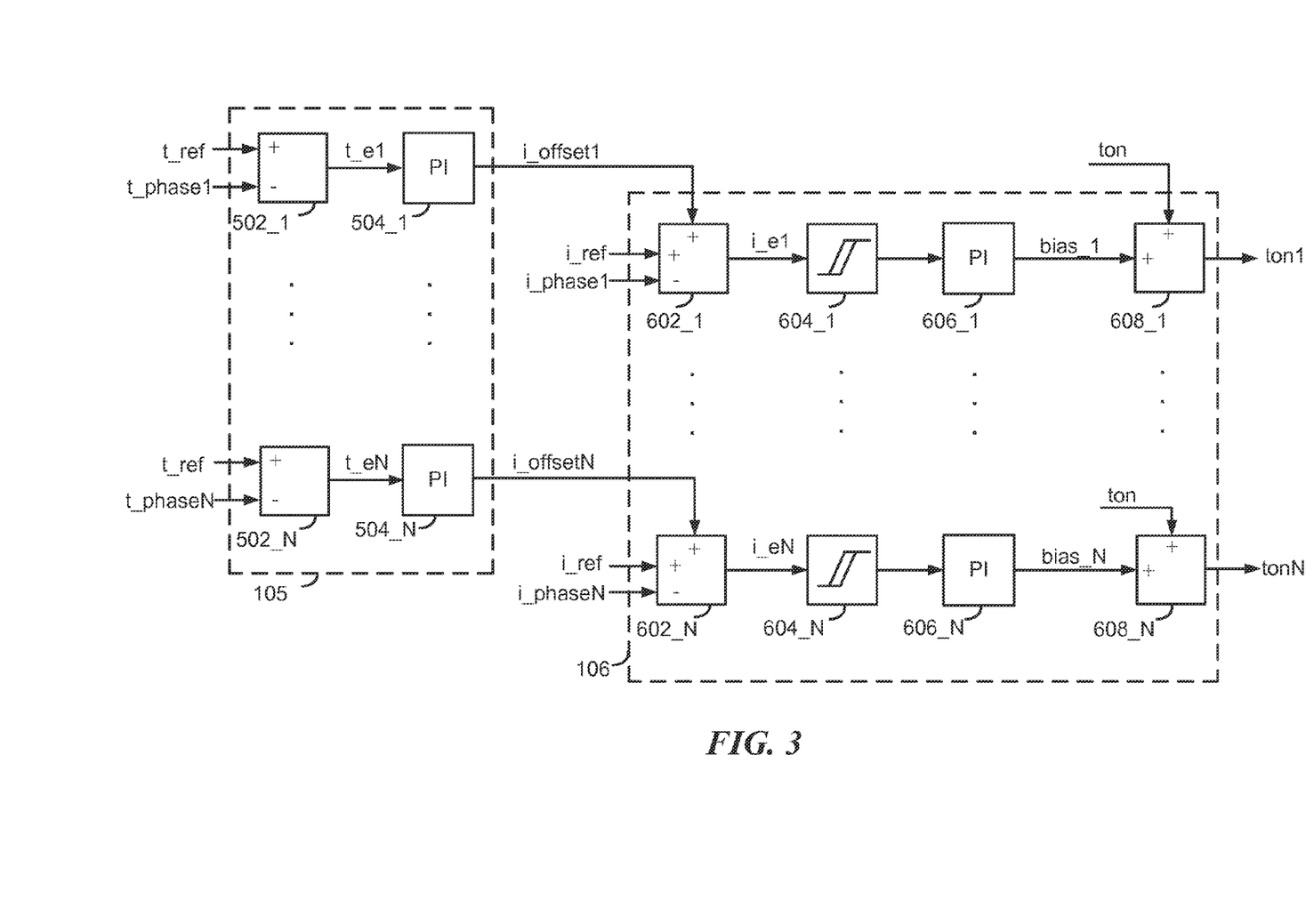
FIG. 3 schematically illustrates the bias current generator 105 and the temperature balance modulating circuit 106 shown in FIG. 2 in accordance with an embodiment of the present invention.

FIG. 3 schematically illustrates the bias current generator 105 and the temperature balance modulating circuit 106 shown in FIG. 2 in accordance with an embodiment of the present invention. The bias current generator 105 comprises subtracters 502_1~502_N and proportional integrators 504_1~504_N. Each of the subtracters 502_x (x=1,2, . . . , N) has a first input terminal, a second input terminal and an output terminal, wherein the first input terminal is configured to receive the temperature reference signal t_ref, the second input terminal is configured to receive the corresponding phase temperature signal t_phasex. The subtracter 502_x subtracts the phase temperature signal t_phasex from the temperature reference signal t_ref, and generates a temperature error signal t_ex at the output terminal. Each of the proportional integrators 504_x has an input terminal and an output terminal, wherein the input terminal is coupled In the output terminal of the corresponding subtracter 502_x to receive the temperature error signal t_ex, the proportional integrator 504_x proportionally integrates the temperature error signal t_ex, and generates the bias current signal i_offsetx at the output terminal.

In the embodiment shown in FIG. 3, the temperature balance modulating circuit 106 comprises add-subtraction arithmetic units 602_1~602_N, proportional integrators 606_1~606_N and adders 608_1~608_N. Each of the add-subtraction arithmetic units 602_x has a first input terminal, a second input terminal, a third input terminal and an output terminal, wherein the first input terminal is configured to receive the current reference signal i_ref, the second input terminal is coupled to the corresponding output terminal of the bias current generator 105 to receive the bias current signal i_offsetx, the third input terminal is coupled to the corresponding switching circuit to receive the corresponding phase current signal i_phasex representative of the output current of the switching circuit. The add-subtraction arithmetic unit 602_x subtracts the phase current signal i_phasex from the sum of the bias current signal i_offsetx and the current reference signal i_ref, and generates a current error signal i_ex at the output terminal. Each of the proportional integrators 606_x has an input terminal and an output terminal, wherein the input terminal is coupled to the output terminal of the corresponding add-subtraction arithmetic unit 602_x to receive the current error signal i_ex. The proportional integrator 606_x proportionally integrates the current error signal i_ex and generates the bias on time signal bias_x at the output terminal. Each of the adders 608_x has a first input terminal, a second input terminal and an output terminal, wherein the first input terminal is coupled to the corresponding output terminal of the proportional integrator 606_x to receive the bias on time signal bias_x, the second input terminal is coupled to receive the predetermined on time signal ton, and wherein the adder 608_x adds the bias on time signal bias_x to the predetermined on time signal ton, and generates an on time signal tonx at the output terminal.

In one embodiment, the temperature balance modulating circuit 106 further comprises amplitude limiters 604_1~604_N. Each of the amplitude limiters 604_x is coupled between the output terminal of the corresponding add-subtraction arithmetic unit 602_x and the input terminal of the corresponding proportional integrator 606_x and is configured to limit the amplitude of the current error signal i_ex to a desired range.

In detail, the bias current generator 105 subtracts the phase temperature signal t_phasex from the temperature reference signal t_ref and generates the temperature error signal t_ex, then the bias current generator 105 proportionally integrates the temperature error signal t_ex, and generates the bias current signal i_offsetx. The temperature balance modulating circuit 106 compares the sum of the bias current signal i_offsetx and the current reference signal i_ref with the phase current signal i_phasex and generates the on time signal tonx of the switching circuit.

In the embodiments described above, the bias on time signal bias_x is used to adjust the on time of the switching circuit. Persons of ordinary skill in the art can recognize, however, that the bias on time signal bias_x may also be used to adjust the switching frequency, duty cycle and other parameters of the switching circuit as long as the output current of the switching circuit can be regulated. For example, based on the bias on time signals bias_x, the duty cycle of the switching circuit may be decreased to decrease the output current when the phase temperature signal t_phasex of the switching circuit is larger than the reference temperature signal t_ref, and the output current of the switching circuits may be increased with the increasing of the duty cycle of the switching circuit when the phase temperature signal t_phasex of the switching circuit is smaller than the reference temperature signal t_ref. Thus the thermal balance can be realized.

Figure 4:
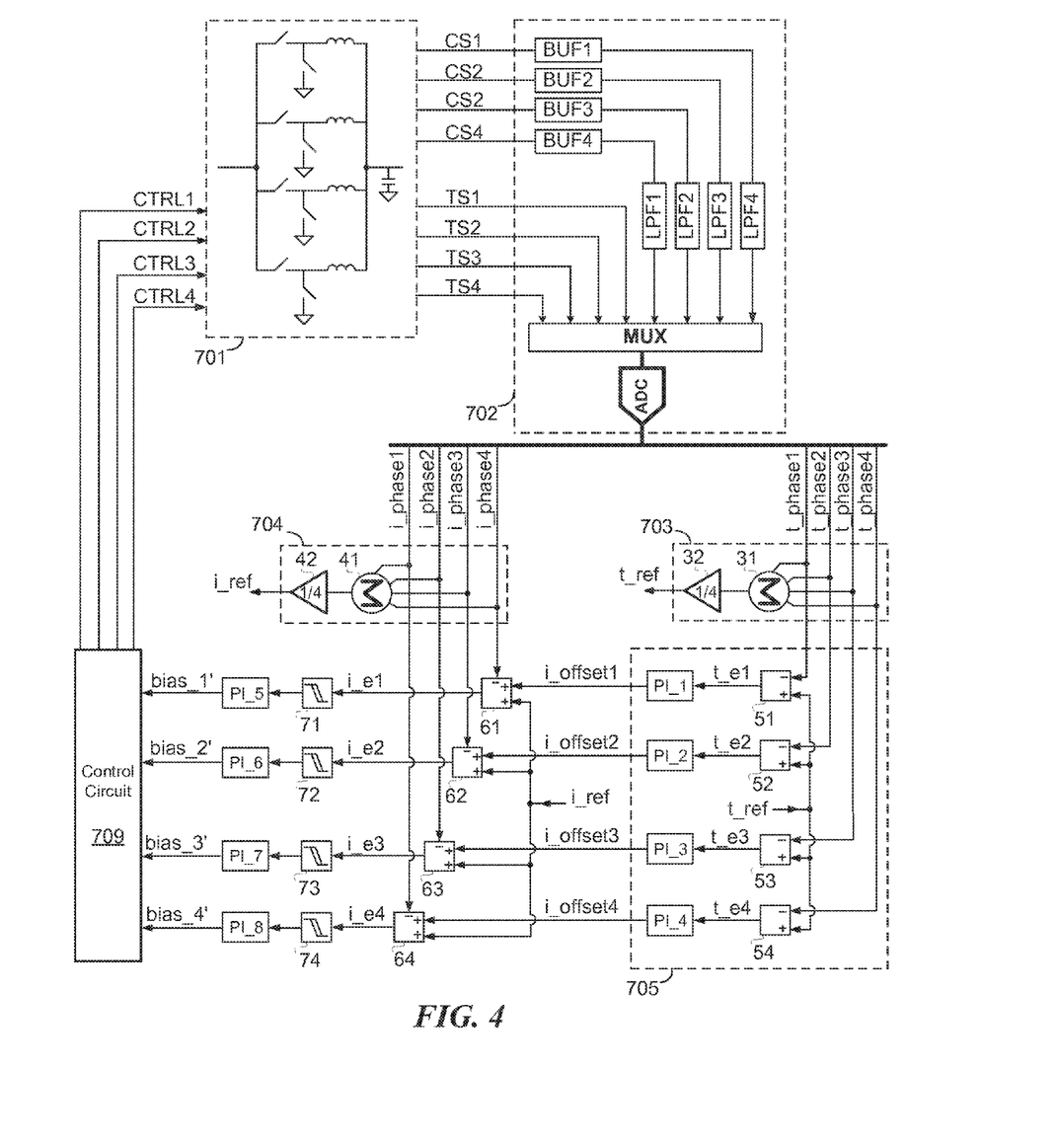
FIG. 4 illustrates a block diagram of a 4-phase switching converter 700 in accordance with an embodiment of the present invention.

FIG. 4 illustrates a block diagram of a 4-phase switching converter 700 in accordance with an embodiment of the present invention. The 4-phase switching converter 700 comprises a 4-phase power converting circuit 701 and a controller. The controller comprises a bias current generator 705, add-subtraction arithmetic units 61-64, proportional integrators PI_5~PI_8 and a control circuit 709. In addition, in the embodiment shown in FIG. 4, the 4-phase switching converter 700 further comprises an analog digital converting circuit 702. The bias current generator 705, the add-subtraction arithmetic units 61~64 and proportional integrators PI_5~PI_8 shown in FIG. 4 are generally similar to that shown in FIG. 3, as a result, the similar description is omitted for clarity.

As shown in FIG. 4, the 4-phase power converting circuit 701 comprises 4 switching circuits. Each of the 4 switching circuits has an input terminal and an output terminal, wherein the input terminal is configured to receive an input voltage Vin, and the output terminals of the 4 switching circuits are coupled together to provide an output voltage Vout to a load.

The analog digital converting circuit 702 has a first set of input terminals, a second set of input terminals and a set of output terminals, wherein each of the first set of input terminals is configured to receive the current sensing signal CSx (x=1,2,3,4) representative of the output current of the corresponding switching circuit, each of the second set of input terminals is configured to receive the temperature sensing signal TSx representative of the temperature of the corresponding switching circuit. The analog digital converting circuit 702 generates the phase current signal i_phasex and the phase temperature signal t_phasex at the output terminals. In one embodiment, a temperature detection system coupled to the switching circuits is used to provide the temperature sensing signals TS1~TS4.

In the embodiment as shown in FIG. 4, the analog digital converting circuit 702 comprises buffers BUF1~BUF4, filters LPF1~LPF4, a multiplexer MUX and an analog digital converter ADC. Each of the buffers BUFx has an input terminal and an output terminal, wherein the input terminal is configured to receive the current sensing signal CSx. The buffer BUFx is configured to isolate the current sensing signal CSx. Each of the filters LPFx has an input terminal and an output terminal, wherein the input terminal is coupled to the output terminal of the buffer BUFx to receive the isolated current sensing signal CSx. The filter LPFx filters the isolated current sensing signal CSx, and generates an average current sensing signal ACSx at the output terminal.

The multiplexer MUX has 8 input terminals and an output terminal, wherein half of the 8 input terminals are respectively coupled to the output terminals of the filters LPF1~LPF4 to receive the average current sensing signals ACS1~ACS4, the rest half are respectively configured to receive the temperature sensing signals TS1~TS4. Under the control of a channel selecting signal, the multiplexer MUX successively provides the average current sensing signals ACS1~ACS4 and the temperature sensing signals TS1~TS4 to its output terminal. The analog digital converter ADC has an input terminal and an output terminal, wherein the input terminal is coupled to the output terminal of the multiplexer MUX, and the output terminal is configured to provide the phase current signals i_phase1~i_phase4 and the phase temperatures signals t_phase1~t_phase4 successively.

As shown in FIG. 4, the bias current generator 705 is configured to receive the phase temperature signals t_phase1~t_phase4, and generates bias current signals i_offset1~i_offset4 based on the phase temperature signals t_phase1~t_phase4 and a temperature reference signal t_ref. In the embodiment as shown in FIG. 4, the bias current generator 705 comprises subtracters 51~54 and proportional integrators PI_1~PI_4. Each of the add-subtraction arithmetic units 6x (x=1,2,3,4) subtracts the phase current signal i_phasex from the sum of a current reference signal i_ref and the corresponding bias current signal i_offsetx, and generates a current error signal i_ex. The proportional integrator PI_x proportionally integrates the current error signal i_ex, and generates the bias signal bias_x' at the output terminal. In one embodiment, the controller further comprises amplitude limiters 71~74.

The control circuit 709 is configured to generate control signals CTRL1~CTRL4 to control the switching circuits of the 4-phase power converting circuit 701. The control circuit 709 is coupled to the output terminals of the proportional integrators PI_5~PI_8 to receive the bias signals bias_1'~bias_4', and generates control signals CTRL1~CTRL4 based on the bias signals bias_1'~bias_4'. The control circuit 709 may adjust the switching frequency, duty cycle and other parameters of the corresponding switching circuit as long as the output current of the switching circuit can be regulated, and thus the thermal balance can be realized.

In one embodiment, the controller further comprises reference temperature generator 703. In one embodiment, the reference temperature generator 703 receives the phase temperature signals t_phase1~t_phaseN and selects one of them as the temperature reference signal t_ref provided to the bias current generator 705. The selected phase temperature signal may be predetermined, or determined by customers according to practical applications. The customer may write a register through a field bus to adjust the temperature reference signal t_ref. In another embodiment, the reference temperature generator 703 takes the average of the phase temperature signals t_phase1~t_phaseN as the temperature reference signal t_ref.

In an embodiment, the controller further comprises a reference current generator 704. In one embodiment, the reference current generator 704 receives the phase current signals i_phase1~i_phaseN and selects one of them as the current reference signal i_ref provided to the add-subtraction arithmetic units 61~64. The selected phase current signal i_ref may be predetermined, or determined by customers according to practical applications. In another embodiment, the reference current generator 704 receives the phase current signals i_phase1~i_phaseN and takes the average of them as the current reference signal i_ref. In the embodiment as shown in FIG. 4, the reference current generator 704 comprises a summator 41 and a divider 42. The summator 41 and the divider 42 are used to provide the average of the phase current signals i_phase1~i_phase4 to the add-subtraction arithmetic units 61~64 as the current reference signal i_ref.

In the embodiments described above, based on the temperature reference signal t_ref and the phase temperature signals t_phase1~t_phase4, the controller generates the bias current signals i_offset1~i_offsetN dependent on thermal condition of the switching circuits. Then the bias current signals i_offset1~i_offset4 as well as the current reference signal i_ref are used to change the output current of the switching circuits by adjusting the control signals CTRL1~CTRL4, and thus the thermal balance of the switching circuits can be realized.

Figure 5:
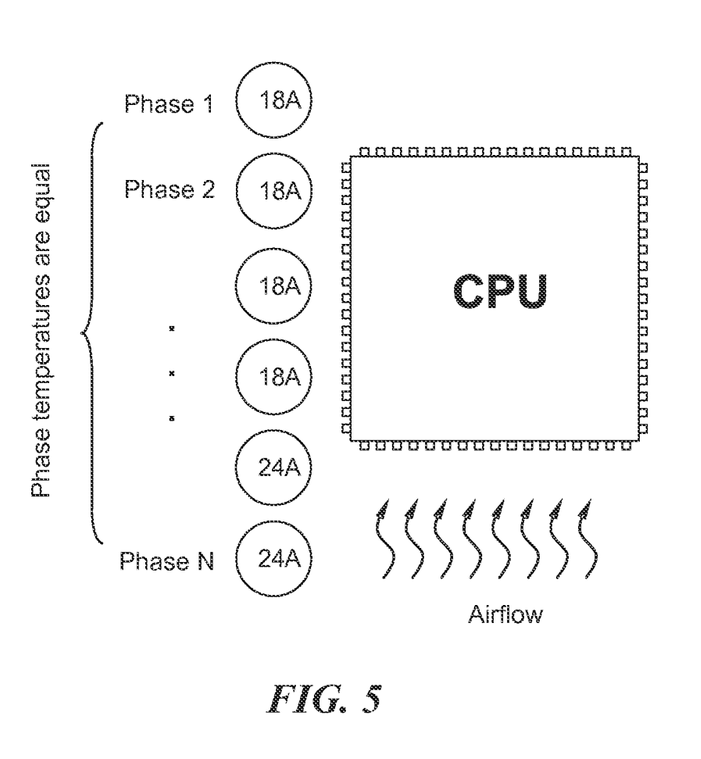
FIG. 5 illustrates the thermal condition of a multi-phase switching converter used in a CPU system in accordance with an embodiment of the present invention.
Figure 6:
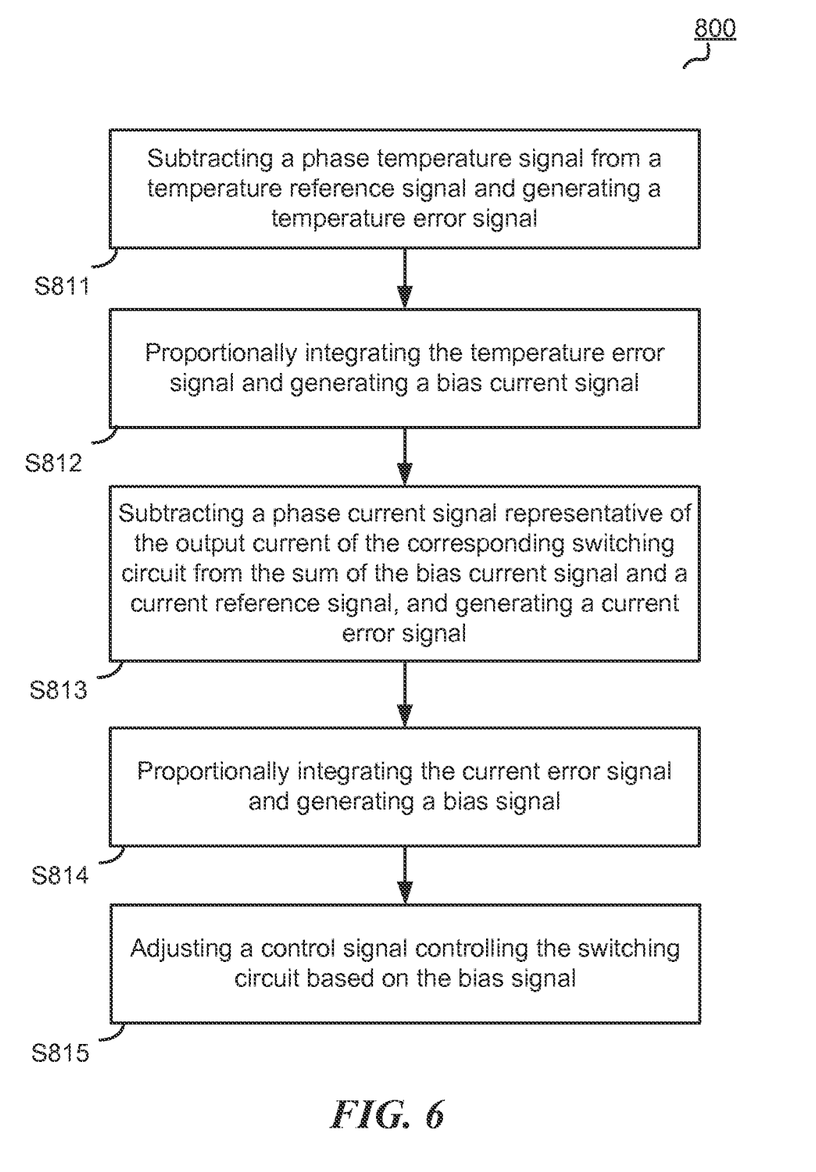
FIG. 6 illustrates a working flow chart of a control method of a multi-phase switching converter in accordance with an embodiment of the present invention.

FIG. 5 illustrates the thermal condition of a multi-phase switching converter used in a CPU system in accordance with an embodiment of the present invention. As shown in FIG. 5, even with the airflow & cooling condition, the output current of the switching circuits in the multi-phase switching converter are adjusted to balance the phase temperature of switching circuits, and the multi-phase switching converter shows good and effective temperature uniformity, FIG. 6 illustrates a working flow chart of a control method of a multi-phase switching converter in accordance with an embodiment of the present invention. The multi-phase switching converter comprises a plurality of switching circuits. The input terminals of the switching circuits receive an input voltage Vin, and the output terminals are coupled together to provide an output voltage Vout to a load. The control method comprises steps S811~S815.

At step S811, a phase temperature signal representative of the temperature of the corresponding switching circuit is subtracted from a current reference signal to generate a temperature error signal. In one embodiment, the temperature reference signal is the average of a plurality of phase temperature signals.

At step S812, the temperature error signal is proportionally integrated to generate a bias current signal.

At step S813, a phase current signal representative of the output current of the corresponding switching circuit is subtracted from the sum of the bias current signal and a current reference signal to generate a current error signal.

At step S814, the current error signal is proportionally integrated to generate a bias signal.

At step S815, a control signal controlling the corresponding switching circuit is adjusted based on the bias signal.

In one embodiment, the control method further comprises limiting the amplitude of the current error signal before proportionally integrating the current error signal.

In one embodiment, the control method further comprises limiting the amplitude of the bias signal after proportionally integrating the current error signal.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

I claim:

1. A controller used in a multi-phase switching converter, wherein the multi-phase switching converter comprises a plurality of switching circuits, the controller comprises:
    a bias current generator having a plurality of input terminals and a plurality of output terminals, wherein the plurality of input terminals are respectively coupled to the plurality of switching circuits to receive a plurality of phase temperature signals representative of the temperature of the plurality of switching circuits, and wherein based on the plurality of phase temperature signals and a temperature reference signal, the bias current generator generates a plurality of bias current signals at the plurality of output terminals;
    a temperature balance modulating circuit coupled to the plurality of switching circuits to receive a plurality of phase current signals representative of the output current of the plurality of switching circuits and coupled to the bias current generator to receive the plurality of bias current signals, wherein the temperature balance modulating circuit is configured to generate a plurality of on time signals based on the plurality of phase current signals, the plurality of bias current signals, a current reference signal and a predetermined on time signal, wherein the temperature balance modulating circuit comprises:
        a plurality of add-subtraction arithmetic units with each of the add-subtraction arithmetic units having a first input terminal, a second input terminal, a third input terminal and an output terminal, wherein the first input terminal is configured to receive the current reference signal, the second input terminal is coupled to the corresponding output terminal of the bias current generator to receive the corresponding bias current signal, the third input terminal is coupled to the corresponding switching circuit to receive the corresponding phase current signal, and wherein the add-subtraction arithmetic unit subtracts the phase current signal from the sum of the bias current signal and the current reference signal, and generates a current error signal at the output terminal;

a plurality of proportional integrators with each of the proportional integrators having an input terminal and an output terminal, wherein the input terminal is coupled to the output terminal of the corresponding add-subtraction arithmetic unit to receive the current error signal, and wherein the proportional integrator proportionally integrates the current error signal, and generates a bias on time signal at the output terminal;

a plurality of adders with each of the adders having a first input terminal, a second input terminal and an output terminal, wherein the first input terminal is coupled to the output terminal of the corresponding proportional integrator to receive the bias on time signal, the second input terminal is coupled to receive the predetermined on time signal, and wherein the adder adds the bias on time signal to the predetermined on time signal, and generates an on time signal at the output terminal; and a logic circuit coupled to the temperature balance modulating circuit to receive the plurality of on time signals, wherein based on the plurality of on time signals, the logic circuit generates a plurality of control signals to control the plurality of switching circuits.

2. The controller of claim 1, wherein the bias current generator comprises:

a plurality of subtractors with each of the subtractors having a first input terminal, a second input terminal and an output terminal, wherein the first input terminal is configured to receive the temperature reference signal, the second input terminal is coupled to the corresponding switching circuit to receive the corresponding phase temperature signal, and wherein the subtractor subtracts the phase temperature signal from the temperature reference signal, and generates a temperature error signal at the output terminal; and a plurality of proportional integrators with each of the proportional integrators having an input terminal and an output terminal, wherein the input terminal is coupled to the output terminal of the corresponding subtractor to receive the temperature error signal, and wherein the proportional integrator proportionally integrates the temperature error signal, and generates the bias current signal at the output terminal.

3. The controller of claim 1, further comprising a plurality of amplitude limiters, wherein each of the amplitude limiters is coupled between the output terminal of the corresponding add-subtraction arithmetic unit and the input terminal of the corresponding proportional integrator, and is configured to limit the amplitude of the corresponding current error signal.

4. The controller of claim 1, further comprising a reference temperature generator having a plurality of input terminals and an output terminal, wherein the plurality of input terminals are coupled to respectively receive the plurality of phase temperature signals, the output terminal is coupled to the bias current generator to provide the temperature reference signal, and wherein the reference temperature generator selects one of the plurality of phase temperature signals as the temperature reference signal.

5. The controller of claim 1, further comprising a reference temperature generator having a plurality of input terminals and an output terminal, wherein the plurality of input terminals are coupled to respectively receive the plurality of phase temperature signals, the output terminal is coupled to the bias current generator to provide the temperature reference signal, and wherein the reference temperature generator takes the average of the plurality of phase temperature signals as the temperature reference signal.

6. A controller used in a multi-phase switching converter, wherein the multi-phase switching converter comprises a plurality of switching circuits, the controller comprises:

a bias current generator having a plurality of input terminals and a plurality of output terminals, wherein the plurality of input terminals are respectively coupled to the plurality of switching circuits to receive a plurality of phase temperature signals representative of the temperature of the plurality of switching circuits, and wherein based on the plurality of phase temperature signals and a temperature reference signal, the bias current generator generates a plurality of bias current signals at the plurality of output terminals;

a plurality of add-subtraction arithmetic units with each of the add-subtraction arithmetic units having a first input terminal, a second input terminal, a third input terminal and an output terminal, wherein the first input terminal is configured to receive the current reference signal, the second input terminal is coupled to the corresponding output terminal of the bias current generator to receive the corresponding bias current signal, the third input terminal is coupled to the corresponding switching circuit to receive a phase current signal representative of the output current of the corresponding switching circuit, and wherein the add-subtraction arithmetic unit subtracts the phase current signal from the sum of the bias current signal and the current reference signal, and generates an current error signal at the output terminal;

a plurality of proportional integrators with each of the proportional integrators having an input terminal and an output terminal, wherein the input terminal is coupled to the output terminal of the corresponding add-subtraction arithmetic unit to receive the current error signal, and wherein the proportional integrator proportionally integrates the current error signal, and generates a bias signal at the output terminal; and a control circuit coupled to the plurality of proportional integrators to receive the plurality of bias signals, wherein based on the plurality of bias signals, the control circuit generates a plurality of control signals to control the plurality of switching circuits.

7. The controller of claim 6, wherein the bias current generator comprises:

a plurality of subtractors with each of the subtractors having a first input terminal, a second input terminal and an output terminal, wherein the first input terminal is configured to receive the temperature reference signal, the second input terminal is coupled to the corresponding switching circuit to receive the corresponding phase temperature signal, and wherein the subtractor subtracts the phase temperature signal from the temperature reference signal, and generates a temperature error signal at the output terminal; and a plurality of proportional integrators with each of the proportional integrators having an input terminal and an output terminal, wherein the input terminal is coupled to the output terminal of the corresponding subtractor to receive the temperature error signal, and wherein the proportional integrator proportionally integrates the temperature error signal, and generates the bias current signal at the output terminal.

8. The controller of claim 6, further comprising a plurality of amplitude limiters, wherein each of the amplitude limiters is coupled between the output terminal of the corresponding add-subtraction arithmetic unit and the input terminal of the corresponding proportional integrator, and is configured to limit the amplitude of the corresponding current error signal.

9. The controller of claim 6, further comprising a reference temperature generator having a plurality of input terminals and an output terminal, wherein the plurality of input terminals are respectively coupled to receive the plurality of phase temperature signals, the output terminal is coupled to the bias current generator to provide the temperature reference signal, and wherein the reference temperature generator takes the average of the plurality of phase temperature signals as the temperature reference signal.

10. A control method of a multi-phase switching converter, wherein the multi-phase switching converter comprises a plurality of switching circuits, the control method comprises:

subtracting a phase temperature signal representative of the temperature of the corresponding switching circuit from a temperature reference signal and generating a temperature error signal;

proportionally integrating the temperature error signal and generating a bias current signal;

subtracting a phase current signal representative of an output current of the corresponding switching circuit from the sum of the bias current signal and a current reference signal, and generating a current error signal;

proportionally integrating the current error signal and generating a bias signal; and adjusting a control signal controlling the switching circuit based on the bias signal.

11. The control method of claim 10, wherein the temperature reference signal is the average of a plurality of phase temperature signals.

12. The control method of claim 10, wherein the control method further comprises:

limiting the amplitude of the current error signal before proportionally integrating the current error signal.

* * * * *